United States Patent
Lee

(10) Patent No.: US 10,794,432 B2
(45) Date of Patent: Oct. 6, 2020

(54) WEDGE CLUTCH WITH BUILT-IN ACTUATOR

(71) Applicant: SCHAEFFLER TECHNOLOGIES AG & CO. KG, Herzogenaurach (DE)

(72) Inventor: Brian Lee, York, SC (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 71 days.

(21) Appl. No.: 16/202,531

(22) Filed: Nov. 28, 2018

(65) Prior Publication Data

US 2020/0166085 A1  May 28, 2020

(51) Int. Cl.
*F16D 25/065* (2006.01)
*F16D 13/20* (2006.01)
*F16D 25/062* (2006.01)
*F16D 13/16* (2006.01)

(52) U.S. Cl.
CPC ........... *F16D 25/065* (2013.01); *F16D 13/16* (2013.01); *F16D 13/20* (2013.01); *F16D 25/062* (2013.01)

(58) Field of Classification Search
CPC ...... F16D 25/062; F16D 25/065; F16D 13/16; F16D 13/20
See application file for complete search history.

(56) References Cited

U.S. PATENT DOCUMENTS

2014/0231208 A1* 8/2014 Lee .................. F16D 21/00
                                                    192/48.5
2016/0238089 A1   8/2016 Lee

* cited by examiner

*Primary Examiner* — Huan Le
(74) *Attorney, Agent, or Firm* — Brooks Kushman P.C.

(57) ABSTRACT

A wedge clutch includes an inner race and an outer race circumscribing the inner race. A wedge element is radially disposed between the inner and outer races and actuatable to couple and decouple the inner and outer races. An actuator is operably coupled with the wedge element and is configured to actuate the wedge element to decouple the inner and outer races.

17 Claims, 5 Drawing Sheets

WEDGE CLUTCH WITH BUILT-IN ACTUATOR

TECHNICAL FIELD

The present disclosure relates to wedge clutches and more specifically to wedge clutches that have an actuator incorporated within the wedge clutch.

BACKGROUND

A clutch is a component used to selectively couple two or more components such as rotatable shafts. The clutch may be engaged to couple the components and may be disengaged to decouple the components. One type of clutch developed is a wedge clutch. A wedge clutch may include an inner race connected to a shaft and an outer race connected to another shaft. A wedge plate is radially disposed between the inner and outer races and is configured to engage the inner and outer races when the clutch is engaged to transmit power from one shaft to another.

SUMMARY

According to one embodiment, a wedge clutch includes an inner race and an outer race circumscribing the inner race. A wedge element is radially disposed between the inner and outer races and actuatable to couple and decouple the inner and outer races. A hydraulic or pneumatic actuator is operably coupled with the wedge element and is configured to actuate the wedge element to decouple the inner and outer races.

According to another embodiment, a wedge clutch includes an inner race and an outer race circumscribing the inner race. A wedge element is radially disposed between the inner and outer races and is actuatable to couple and decouple the inner and outer races. The clutch also includes a piston chamber and a piston engageable with the wedge element and disposed in the chamber. The piston and the chamber are configured to cooperate to drive the piston into the wedge element to decouple the inner and outer races when fluid or gas is supplied to the chamber.

According to yet another embodiment, a wedge clutch includes an inner race and an outer race circumscribing the inner race. A plurality of arcuate segments are arranged in pairs and are circumferentially disposed around the inner race such that each pair forms a section of a wedge cylinder that includes springs disposed between the sections to bias the arcuate segments of each pair towards each other. The springs bias the arcuate segments of each pair towards each other to contract the wedge cylinder onto the inner race so that the races lock in response to relative rotation between the outer race and the wedge cylinder. The clutch further includes fingers engageable with the arcuate segments of each pair such that axial movement of the fingers towards the wedge cylinder moves the arcuate segments of each pair away from each other to expand the wedge cylinder and disengage the races. An actuator is configured to axially move the fingers toward the arcuate segments to engage the fingers with the arcuate segments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
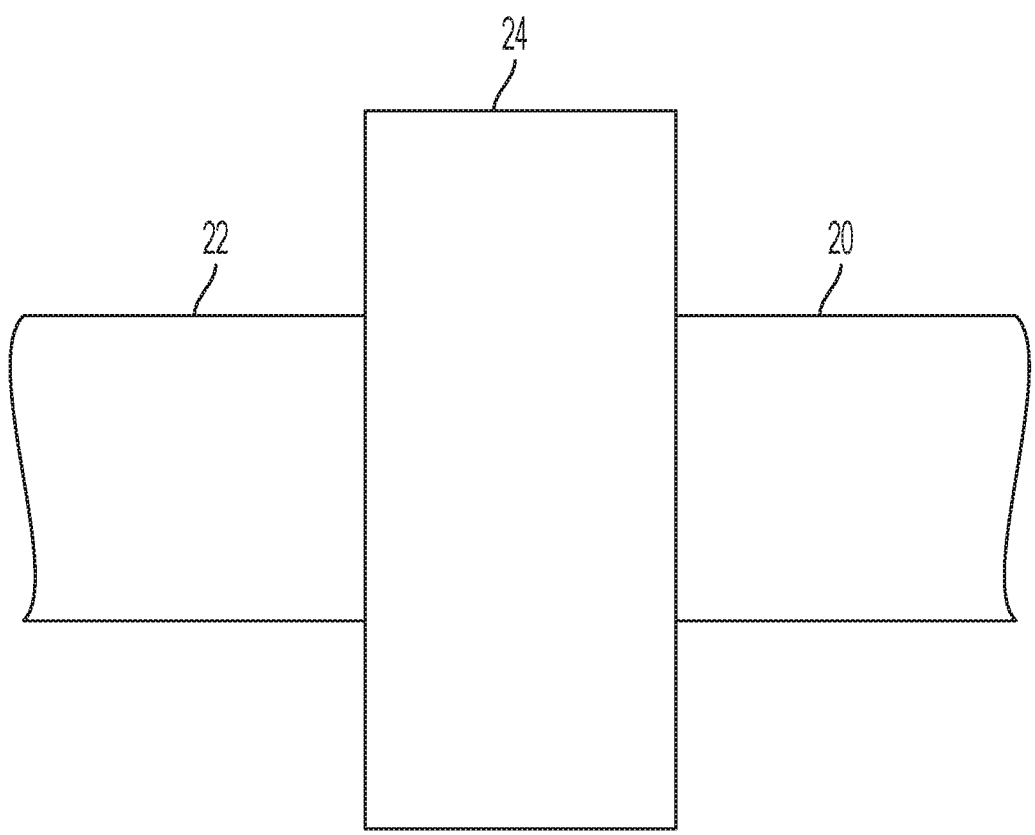
FIG. 1 side view of a clutch arranged between a pair of shafts.

Referring to FIG. 1, a pair of rotating members 20, 22 may be selectively coupled by a clutch 24. The rotating members 20, 22 and the clutch 24 may be for a vehicle. The clutch 24 may include a plurality of modes that engage and disengage the rotating members 20, 22 in a variety of directions. For example, the clutch 24 includes a fully locked mode in which the rotating members 20, 22 are coupled in both rotational directions and a fully unlocked mode in which the rotating members 20, 22 are decoupled. The clutch 24 may be biased to the fully locked mode.

Figure 2:
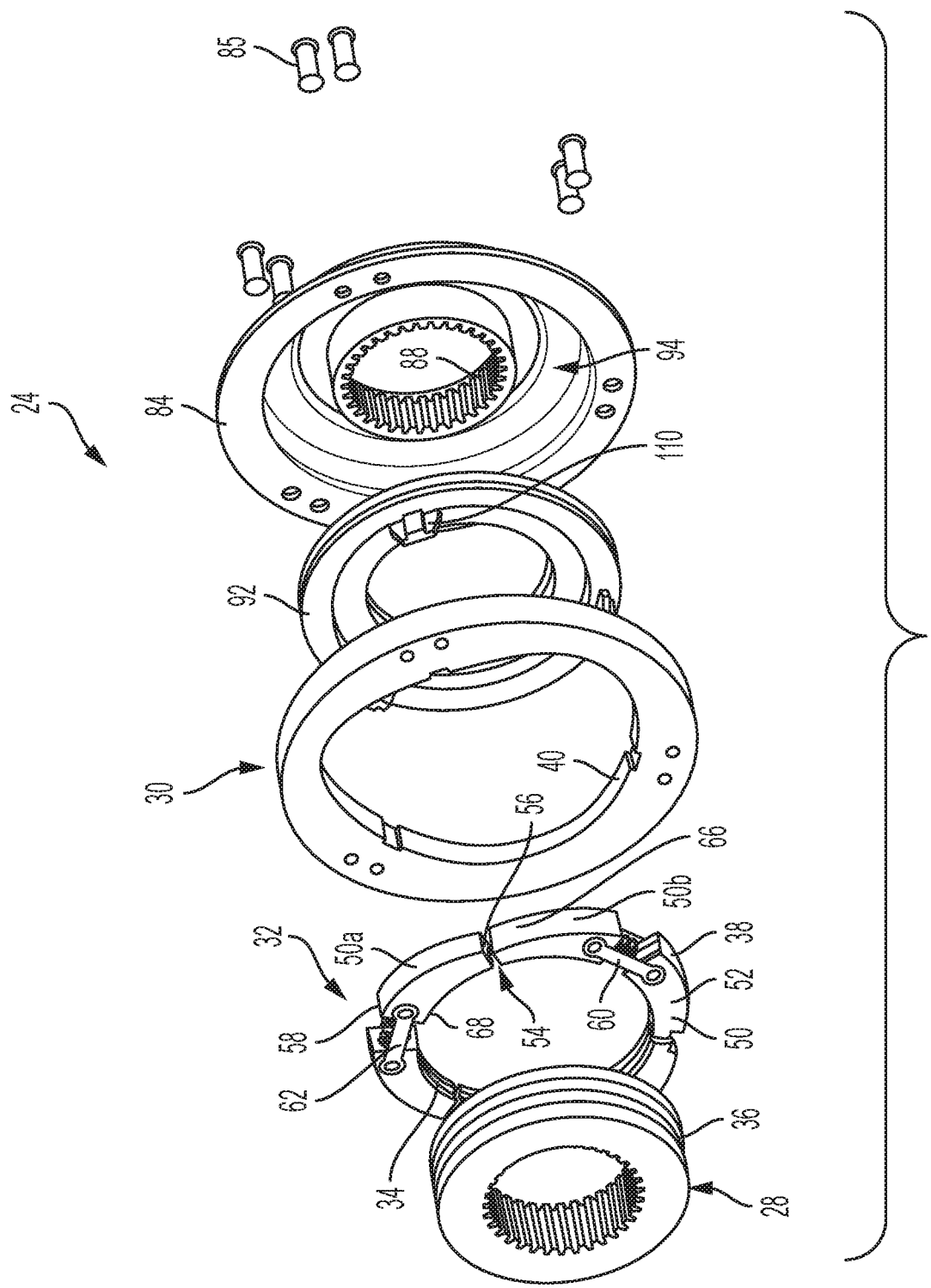
FIG. 2 is an exploded perspective view of the clutch according to one embodiment.
Figure 3:
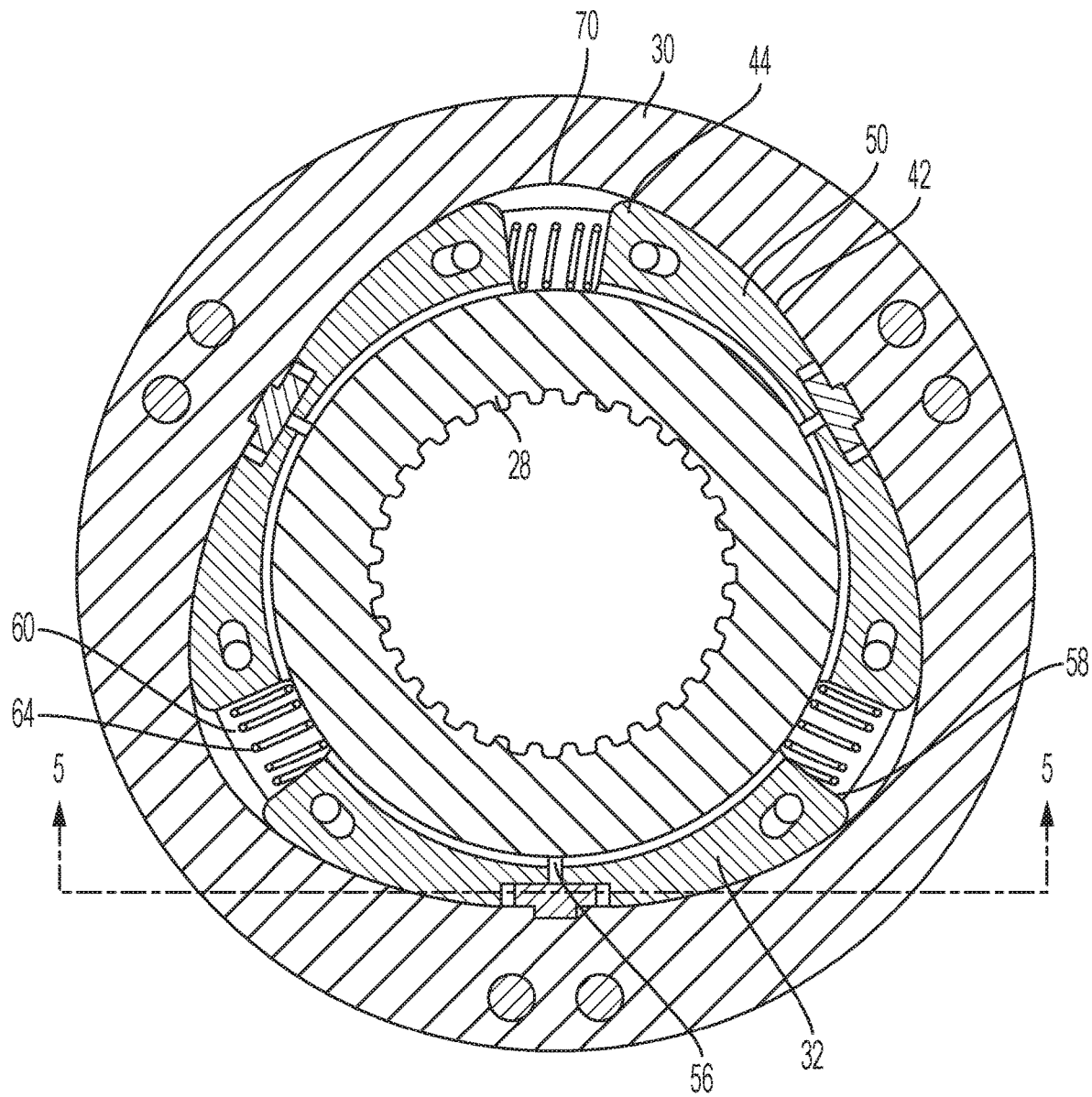
FIG. 3 is an axial cross-sectional view of the clutch of FIG. 2.

Referring to FIGS. 2 and 3, the clutch 24 may include a housing (not shown) that is attachable to a support such as a vehicle chassis or other fixed structure. Inner and outer races 28, 30 are supported for concentric rotation within the housing. The housing may define a seat that receives a roller bearing, which supports the outer race 30 for rotation.

A wedge element 32 is radially disposed between the inner and outer races 28, 30 and is configured to selectively couple and decouple the races 28, 30 in a variety of rotational directions depending upon the mode of the clutch 24 and the specific design of the wedge element. The wedge element 32 is radially expandable between a contracted position in which an inner surface of the wedge element 32 is seated on the inner race 28 and an expanded position in which the inner surface is slightly spaced from the inner race 28. The clutch 24 is engageable when the wedge element 32 is in the contracted position and is not engageable when in the expanded position. The clutch 24 can be engaged and disengaged by moving the wedge element 32 between the expanded and contracted positions.

An inner surface of the wedge element 32 may define a plurality of axially spaced circumferential projections 34 (e.g., raised rings) that are received in a plurality of axially spaced circular grooves 36 defined in the outer surface of the inner race 28. When the clutch 24 is engaged, friction between the projections 34 and the grooves 36 rotationally lock the wedge element 32 to the inner race 28. The wedge element 32 includes a cam surface 38 that engages and cooperates with a cam surface 40 defined on the outer race 30. The cam surface 40 defines a plurality of ramps 42 configured to engage with lobes 44 of the cam surface 38 to wedge the wedge element 32 between the inner and outer races 28, 30 responsive to the wedge element 32 and the outer race 30 rotating relative to each other. The wedging action induced by the cam surfaces 38, 40 tightly clamps the wedge element 32 to the inner race 28 creating a friction coupling. The ramps 42 and lobes 44 are sized so that they cannot slide over each other and cooperate to lock the wedge element 32 to the outer race 30.

According to one or more embodiments, the wedge element 32 may be formed of a plurality of arcuate segments 50 circumferentially arranged around the inner race 28 to form a cylindrical body 52. The segments 50 are arranged in pairs to form a plurality of arcuate wedge sections 54 of the body 52. Each of the sections 54 includes a first segment 50a and a second segment 50b, which may be mirror images of each other. The segment pairs 54 are arranged with first ends 56 facing each other and with second ends 58 facing away from each other. A plurality of spring links 60 may be circumferentially arranged between the sections 54. Each spring link 60 may include a link 62 attached between adjacent segments 50 and a resilient member 64, e.g., a coil spring. The resilient members 64 bias the segments 50a and 50b towards each other, and bias the sections 54 away from each other. In the illustrated embodiment, there are six segments 50 arranged into three sections 54 and three resilient members 64 (one resilient member disposed between each section 54). Different amounts of segments, sections, and resilient members may be used in other embodiments.

The thickness of each segment 50 varies between the first and second ends 56, 58 to create the cam surface 38. The second end 58 is thicker (in the radial direction) than the first end 56 causing the outer surface 66 to slope radially outward from the first end 56 towards the second end 58. The outer surface 66 of each segment 50 defines a portion of the cam surface 38. The above-mentioned lobes 44 are the outermost portion of the cam surface 38 and are generally formed by the outer surfaces 66 near the second ends 58. The inner surface 68 of each segment 50 is an arc having a constant radius that substantially matches that of the outer diameter of the inner race 28.

The cam surface 40 of the outer race 30 has a profile that substantially matches the cam surface 38 of the wedge element 32. The cam surface 40 includes radially extending ramps 42 and pockets 70. The matching shapes of the cam surfaces 38, 40 allow the wedge element 32 to nest within the outer race 30 with the lobes 44 disposed in the pockets 70.

The resilient members 64 bias the wedge element 32 to the contracted position in which each of the segments 50 is in frictional contact with the inner race 28 creating sufficient drag to rotate the wedge element 32 relative to the outer race 30. Relative rotation between the outer race 30 and the wedge element 32 misaligns the cam surfaces 38, 40, i.e., the ramps 42 slide into the lobes 44, causing further radial contraction of the wedge element 32. This further radial contraction clamps the wedge element 32 onto the inner race 28 with sufficient friction force to rotationally lock the outer race 30 to the inner race 28, which engages the clutch 24. The wedge element 32 may be biased to an engaged position and the clutch 24 may be disengaged by separating the segments 50a and 50b to move the wedge element 32 to the expanded position.

Figure 4:
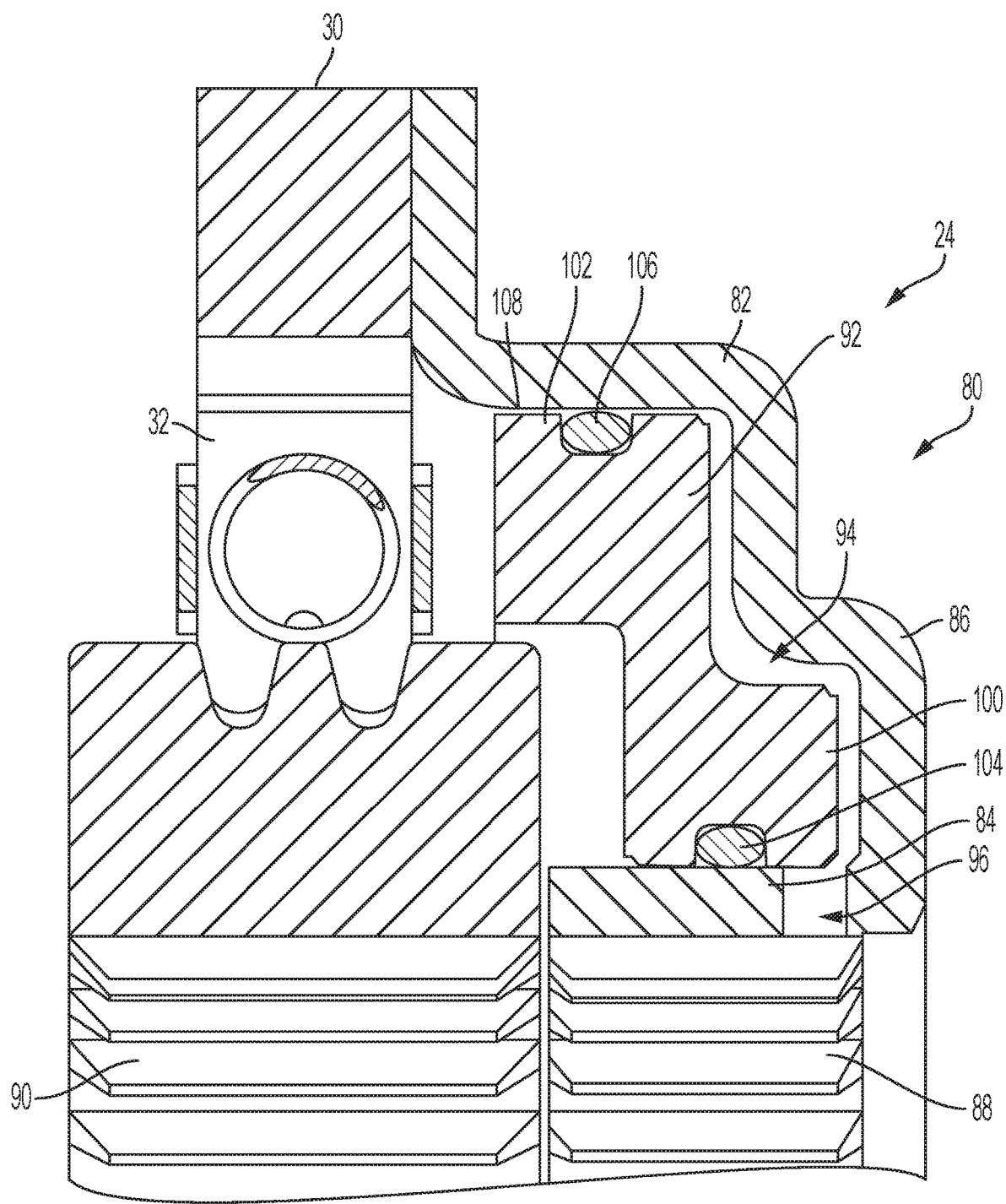
FIG. 4 is a partial side cross-sectional view of the clutch of FIG. 2.

Referring to FIGS. 2 and 4, an actuator 80 may be used to actuate the wedge element 32 (actuator not shown in FIG. 2). The actuator may be hydraulic or pneumatic. In the illustrated embodiment, the actuator is hydraulic. The actuator 80 may be built-in with the clutch 24. For example, the actuator 80 may include a cover 82 that is attached to the outer race 30 for example by rivets 85 or other means. The cover 82 includes a hub 84 and a shell 86 extending between the outer race 30 and the hub 84. The hub 84 is configured to connect with the rotating member 20, or alternatively to rotating member 22. The hub 84 may define an internal spine 88 that receives an external spline of the rotating member 20 to rotationally lock the outer race 30 to the rotating member 20. Similarly, the inner race 28 may define an internal spline 90 to connect with an external spline of the rotating member 22, or alternatively rotating member 20. The cover 82 is a torque carrying member and the shell 86 forms a power flow path between the outer race 30 and the hub 84.

The cover 82 defines a chamber 94 configured to receive fluid or gas via at least one orifice 96. The chamber may be referred to a piston chamber, a hydraulic chamber, or a pneumatic chamber depending upon the design. An annular piston 92 is disposed in the chamber 94 adjacent to the wedge element 32. The piston 92 may have a Z-shaped cross-section having a first portion 100 and a second portion 102. The first portion 100 is disposed on the hub 84 and includes a seal 104 engaging with an outer surface of the hub 84. The second portion 102 is disposed adjacent to the wedge element 32 and includes a seal 106 disposed against an axially extending surface 108 of the cover 82. The piston 92 may include a plurality of fingers 110 projecting axially from the second portion 102. The fingers 110 are circumferentially arranged around a face of the second portion 102 and are positioned to extend between the sections 54 of the wedge element 32. The number of fingers 110 may be equal to the number of sections 54 and in the illustrated embodiment, the piston has three fingers 110. The piston 92 is axially slidable to engage and disengage the fingers 110 with the wedge element 32. Moving the piston 92 towards the wedge element 32 expands the wedge element 32 to disengage the clutch, and moving the piston 92 away from the wedge element contracts the wedge element 32 and allows the clutch 24 to engage.

The piston 92 is actuated by the chamber 94 according to a fluid or gas pressure within the chamber 94. In some embodiments, the chamber 94 is responsible for urging the piston 92 towards the wedge element 32 and a return mechanism (not shown) urges the piston 92 away from the wedge element 32. The return mechanism may be a resilient member such as a spring. The piston 92 is actuated towards the wedge element 32 by flowing fluid into the chamber 94 via the one or more orifice 96. The fluid may be supplied by a transmission valve body or other fluid source. The fluid enters the chamber 94 between a back side of the piston 92 and the cover 82. Responsive to fluid pressure exceeding a threshold, the piston 92 is driven into the wedge element 32 to disengage the clutch 24. The clutch 24 may be reengaged by ceasing to apply fluid pressure to the chamber 94. The fluid within the chamber 94 may exit via the orifice 96. In some embodiments, the cover may define bleeder holes (not shown) that allow fluid to exit the chamber 94.

Figure 5:
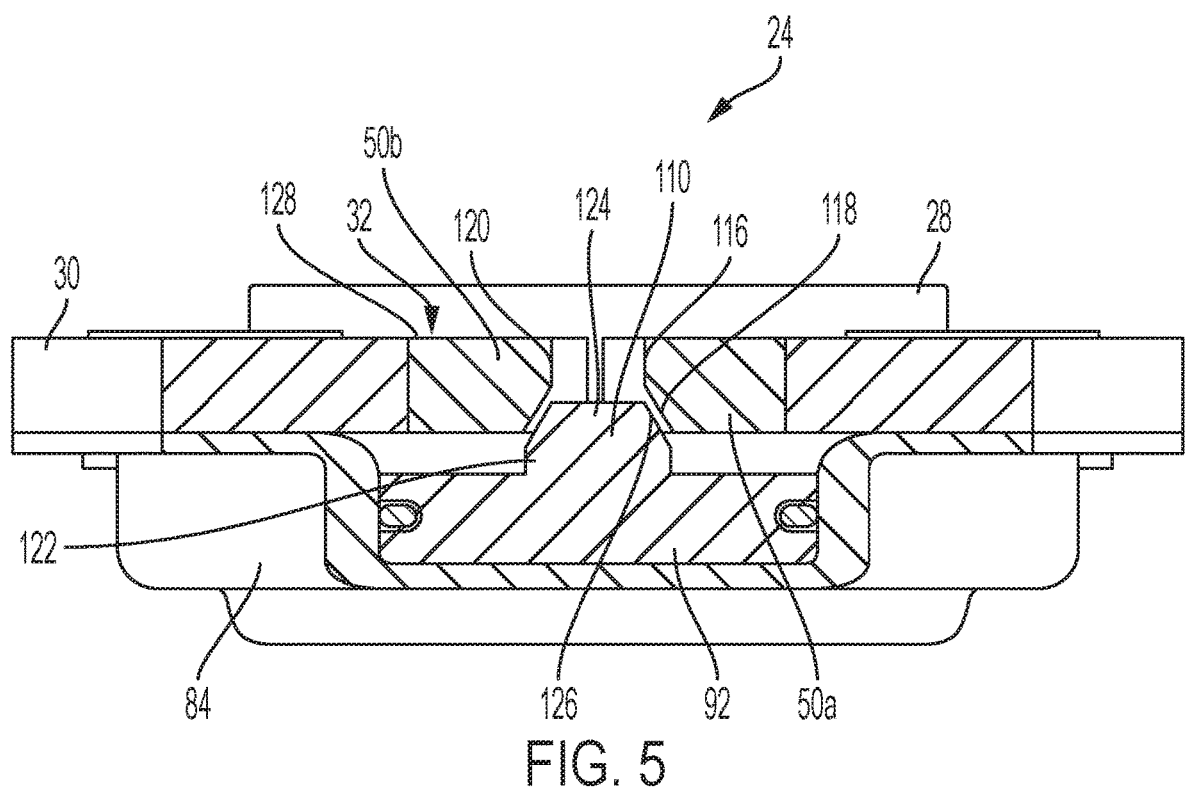
FIG. 5 is top cross-sectional view along cutline 5-5.

Referring to FIG. 5, the clutch 24 can be disengaged by separating the segments 50a and 50b of each pair to move the wedge element 32 to the expanded position. The fingers 110 move the wedge element 32 between the contracted and expanded positions. The arcuate segments 50 may define slots 116.

Each of the slots 116 is recessed into a corresponding one of the sections 54 with the first segment 50a defining one half of the slot 116 and the second segment 50b defining the other half of the slot 116. Each slot 116 includes a first portion 118 and a second portion 120 that is narrower than the first portion 118. The fingers 110 have a shape that substantially matches the slots 116. Each of fingers 110 may include a main portion 122 and a tip 124. The tip 124 is sized to fit within the first portion 118 without engaging the wedge element 32. This corresponds with the piston being in a resting position in which the clutch 24 is engaged. The tip 124 may include angled sides 126 that match the angled sides 128 of the first portion 118.

Axial movement of the piston 92 towards the wedge element 32 disengages the clutch 24 by driving the angled sides 126 into the angles sides 128 to separate the segments pairs 50a and 50b of each section 54 moving the clutch element 32 to the expanded position. The amount of separation can be tuned by adjusting the width of the fingers 110 and the slots 116. The axial force required to separate the segments pairs can be adjusted by modifying the slope of the angled sides.

The above-described clutch 24 is but one example embodiment of a segmented wedge element operated by a built-in actuator. This disclosure, however, is not limited to the above-described wedge element. For example, the wedge element may be an expandable disk that rides on a conical surface. Applicant's U.S. patent application Ser. No. 15/388,239, filed Dec. 22, 2016 describes examples of this type of wedge clutch and is incorporated in its entirety by reference herein. Here, the clutch is engaged by sliding the conical surface so that the disk is seated on the larger diameter end of the conical surface. A hydraulic or pneumatic actuator may be used to slide conical surface. For example, the conical surface may be formed on hub that is driven by a piston such as piston 92.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

20 rotating member
22 rotating member
24 clutch
28 inner race
30 outer race
32 wedge element
34 projection
36 groove
38 camp surface
40 cam surface
42 ramp
44 lobe
50 segment
52 cylindrical body
54 section
56 first end
58 second end
60 spring link
62 link
64 resilient member
66 outer surface
68 inner surface
70 pocket
80 actuator
82 cover
84 hub
85 rivet
86 shall
88 internal spline
90 internal spline
92 piston
94 chamber
96 orifice
$101^{st}$ portion
102 second portion
104 seal
106 seal
108 surface
110 finger
116 slot
118 first portion
$122^{nd}$ portion
122 main portion
124 tip
126 angled side
128 angled side

What is claimed is:

1. A wedge clutch comprising:
an inner race;
an outer race circumscribing the inner race;
a wedge element radially disposed between the inner and outer races and actuatable to couple and decouple the inner and outer races; and
a hydraulic or pneumatic actuator including an annular piston having axially extending fingers configured to engage with the wedge element and configured to actuate the wedge element to decouple the inner and outer races.

2. The wedge clutch of claim 1, wherein the actuator includes a cover cooperating with the outer race to define a chamber, and the piston is disposed in the chamber.

3. The wedge clutch of claim 2, wherein the cover includes a hub and a shell extending between the outer race and the hub, wherein the shell forms a power flow path between the outer race and the hub, and the hubs defines internal spines.

4. The wedge clutch of claim 2, wherein the actuator is hydraulic.

5. The wedge clutch of claim 2, wherein the actuator is hydraulic, and the cover defines an orifice in fluid communication with the hydraulic chamber.

6. The wedge clutch of claim 1, wherein the wedge element has a plurality of arcuate segments collectively defining a cylinder that encircles the inner race, and resilient members interposed with the segments, and wherein the fingers are disposed between the arcuate segments.

7. The wedge clutch of claim 6, wherein the fingers are tapered to expand the wedge element when the piston moves axially toward the wedge element to decouple the inner and outer races.

8. The wedge clutch of claim 1, wherein the inner race defines at least one circular groove and the wedge element defines at least one circular raised ring configured to frictionally engage with the groove when the clutch is engaged.

9. A wedge clutch comprising:
an inner race;
an outer race circumscribing the inner race;
a wedge element radially disposed between the inner and outer races and actuatable to couple and decouple the inner and outer races;
a cover cooperating with the outer race to define a piston chamber; and
a piston engageable with the wedge element and disposed in the chamber, the piston and the chamber being configured to cooperate to drive the piston into the wedge element to decouple the inner and outer races when fluid or gas is supplied to the chamber.

10. The wedge clutch of claim 9, wherein the wedge element has a plurality of arcuate sections collectively defining a cylinder that encircles the outer race, and resilient members interposed with the sections, each of the sections includes first and second arcuate segments circumferentially movable relative to each other, wherein the cylinder contracts to engage the wedge clutch in response to the first and second segments moving circumferentially towards each other, and the cylinder expands to disengage the wedge clutch in response to the first and second segments moving circumferentially away from each other.

11. The wedge clutch of claim 10, wherein the piston defines axially extending fingers each disposed between an associated one of the first and second arcuate segments and configured to drive the first and second arcuate segments apart to disengage the wedge clutch.

12. A wedge clutch comprising:
an inner race;
an outer race circumscribing the inner race;
a plurality of arcuate segments arranged in pairs and circumferentially disposed around the inner race such that each pair forms a section of a wedge cylinder that includes springs disposed between the sections to bias the arcuate segments of each pair towards each other, wherein the springs bias the arcuate segments of each pair towards each other to contract the wedge cylinder onto the inner race so that the races lock in response to relative rotation between the outer race and the wedge cylinder;
fingers engageable with the arcuate segments of each pair such that axial movement of the fingers towards the wedge cylinder moves the arcuate segments of each pair away from each other to expand the wedge cylinder and disengage the races; and
an actuator configured to axially move the fingers toward the arcuate segments to engage the fingers with the arcuate segments.

13. The wedge clutch of claim 12 wherein the actuator is hydraulic and includes a hydraulic chamber, and a piston disposed in the hydraulic chamber and configured to drive the fingers.

14. The wedge clutch of claim 13, wherein the fingers are formed on the piston.

15. The wedge clutch of claim 12, wherein the actuator includes a cover cooperating with the outer race to define a chamber, and a piston disposed in the chamber.

16. The wedge clutch of claim 15, wherein the cover has a hub that defines an internal spline.

17. The wedge clutch of claim 16, wherein actuator is hydraulic, and the hub defines an orifice in fluid communication with the chamber.

* * * * *